US011072541B2

(12) United States Patent
Nazzer (10) Patent No.: US 11,072,541 B2
(45) Date of Patent: Jul. 27, 2021

(54) PROCESS AND APPARATUS FOR SEPARATING VALUABLE OR HARMFUL LIQUIDS FROM SLURRIES

(71) Applicant: PRIME SERVICES TRUSTEE LIMITED, New Plymouth (NZ)

(72) Inventor: Craig Nazzer, New Plymouth (NZ)

(73) Assignee: PRIME SERVICES TRUSTEE, LTD., New Plymouth (NZ)

( * ) Notice: Subject to any disclaimer, the term of this patent is extended or adjusted under 35 U.S.C. 154(b) by 26 days.

(21) Appl. No.: 16/413,344

(22) Filed: May 15, 2019

(65) Prior Publication Data

US 2019/0263678 A1 Aug. 29, 2019

Related U.S. Application Data

(62) Division of application No. 15/505,957, filed as application No. PCT/NZ2015/050120 on Aug. 25, 2015, now abandoned.

(30) Foreign Application Priority Data

Aug. 25, 2014 (NZ) .......................................... 629329

(51) Int. Cl.
*C02F 1/00* (2006.01)
*B01D 12/00* (2006.01)
(Continued)

(52) U.S. Cl.
CPC .............. *C02F 1/004* (2013.01); *B01D 12/00* (2013.01); *B01D 29/86* (2013.01); *B01D 33/21* (2013.01);
(Continued)

(58) Field of Classification Search
CPC ...... C02F 1/004; C02F 11/121; C02F 11/127; C02F 1/38; C02F 2103/28;
(Continued)

(56) References Cited

U.S. PATENT DOCUMENTS 3,293,227 A * 12/1966 Boggess .................... C08J 3/16
528/499
4,289,578 A 9/1981 Greenfield et al.
(Continued)

FOREIGN PATENT DOCUMENTS

DE 10104812 A1 8/2002
EP 0289674 A1 11/1988
(Continued)

OTHER PUBLICATIONS

EP Application No. EP15835559 Extended Search Report dated May 2, 2018.
(Continued)

*Primary Examiner* — Liam Royce
(74) *Attorney, Agent, or Firm* — Mossman, Kumar & Tyler, P.C.

(57) ABSTRACT

This invention relates generally to a filtration process and apparatus for separating valuable or harmful process liquids from mixtures or slurries that contain such liquids and solid particles. In particular, the invention relates to a filtration process for separating Process Liquid from a feed slurry that comprises a mixture of the Process Liquid and solid particles, the process employing a Sweep Liquid that is less dense than the Process Liquid.

6 Claims, 4 Drawing Sheets

(51) Int. Cl.
*B01D 29/86* (2006.01)
*C02F 11/121* (2019.01)
*C02F 11/127* (2019.01)
*C02F 1/38* (2006.01)
*B01D 33/21* (2006.01)
*B01D 33/68* (2006.01)
*B01D 33/54* (2006.01)
*B01D 29/075* (2006.01)
*C02F 103/28* (2006.01)
*C02F 103/36* (2006.01)
*C02F 103/16* (2006.01)
*C02F 103/34* (2006.01)

(52) U.S. Cl.
CPC ............. *B01D 33/54* (2013.01); *B01D 33/68* (2013.01); *C02F 1/38* (2013.01); *C02F 11/121* (2013.01); *C02F 11/127* (2013.01); *B01D 2029/075* (2013.01); *C02F 2103/16* (2013.01); *C02F 2103/28* (2013.01); *C02F 2103/343* (2013.01); *C02F 2103/365* (2013.01)

(58) Field of Classification Search
CPC ............ C02F 2103/365; C02F 2103/16; C02F 2103/343; B01D 12/00; B01D 29/86; B01D 33/21; B01D 33/68; B01D 33/54; B01D 2029/075
See application file for complete search history.

(56) References Cited

U.S. PATENT DOCUMENTS

| | | | |
|---|---|---|---|
| 4,717,485 A | 1/1988 | Brunsell et al. | |
| 5,993,608 A | 11/1999 | Abry et al. | |
| 6,685,802 B1 | 2/2004 | Nazzer | |
| 7,255,792 B2 * | 8/2007 | Livington ............ | B01D 61/025 210/641 |
| 7,531,086 B2 | 5/2009 | Benesi et al. | |
| 8,652,304 B2 | 2/2014 | Nazzer | |
| 2014/0374365 A1 | 12/2014 | Nazzer | |
| 2016/0271531 A1 | 9/2016 | Nazzer | |

FOREIGN PATENT DOCUMENTS

| | | |
|---|---|---|
| EP | 2745906 A1 | 6/2014 |
| GB | 2419100 A | 4/2006 |
| WO | 2014014361 A2 | 1/2014 |
| WO | 2015005806 A1 | 1/2015 |
| WO | 2016032344 A2 | 3/2016 |

OTHER PUBLICATIONS

Olapinski—DE 10104812 translation and original attached Year: 2002.

* cited by examiner

PROCESS AND APPARATUS FOR SEPARATING VALUABLE OR HARMFUL LIQUIDS FROM SLURRIES

CROSS-REFERENCE TO RELATED APPLICATIONS

This application is a divisional of Ser. No. 15/505,957, filed Feb. 23, 2017, which is a 371 National Phase of International Application.: PCT/NZ2015/050129, filed Aug. 25, 2015 which claims benefit of New Zealand Application No.: NZ629379, filed Aug. 25, 2014, the entire disclosure of which is incorporated herein by reference in its entirety.

FIELD OF THE INVENTION

This invention relates generally to a filtration process and apparatus for separating valuable or harmful process liquids from mixtures or slurries that contain such liquids and solid particles.

BACKGROUND

Many industrial and commercial processes utilize a valuable and/or potentially harmful process liquid that becomes mixed with finely divided waste solid matter. For commercial and environmental reasons it is desirable to recover this liquid before disposing of the waste matter. Many types of devices including gravity separators, cyclone separators, filters, clarifiers, centrifuges, and combinations thereof, are used for this purpose.

The simpler gravity separators typically yield a waste sludge or sediment that contains a significant amount of the original process liquid. This can lead to high loss of the process liquid in the waste sediment unless further steps are added to the process to recover process liquid from the sediment. Furthermore gravity is not always an effective driving force for separation if the particles are very fine and remain suspended without settling in a timely manner.

Filters and centrifuges are typically able to recover a higher fraction of the original process liquid than gravity type separators. Filters are often preferred because they are generally simple and compact, and less costly than centrifuges. In a filter the solid particles typically accumulate in a wet filter cake.

A major drawback of filtration systems in which a filter cake is formed is the reduction in flow as the filter cake builds in thickness. As more solids-contaminated liquid flows through the Filter Medium, the filter cake becomes thicker, resulting in higher resistance to the flow of the liquid through the filter. The pressure must then be increased (or the filtration area increased) to maintain a high flow rate, however increasing the pressure in a filter increases costs and potential hazards, and may not be desirable or feasible. In response to this problem the filtering process is typically periodically interrupted to remove the filter cake and then resume filtration. The cake is often removed by scraping, shaking, flushing or using reverse flow to push the filter cake off the Filter Medium, e.g., via a backwash, backflow, gas pulse, etc. Alternatively, many filters have disposable elements such as cartridges that are replaced when caked with solid matter.

Cross flow filtration is often used to overcome the problem of increased resistance to filtrate flow caused by a filter cake. In cross flow filtration the slurry flows across the filter surface, no significant filter cake forms and liquid passes through the filter media. The flow of liquid across the surface of the filter is intended to impede or prevent clogging of the filter and to maintain a higher filtrate flow than would otherwise be possible if a filter cake were to form. This concept has been further adapted by several filtration equipment vendors to include designs in which the Filter Medium itself rotates or vibrates so as to enhance the shear forces acting at the surface of the Filter Medium. In the absence of further refinements the liquid in the resultant thickened slurry that is produced in these cross flow filtration systems is still the original process liquid, hence disposal of this slurry without further treatment can result in significant loss of process liquid.

In basic filtration, in the absence of further improvements, the liquid contained in the filter cake or thickened slurry has essentially the same composition as the original liquid that entered the filter. For water miscible process liquids a washing step using water is commonly added to remove a portion of the process liquid from the filter cake. This washing can be via dilution or displacement. The commonly known drawbacks to displacement washing include uneven distribution and flow of wash water through the filter cake. However dilution washing is also not ideal because of the higher consumption of wash water and greater dilution of the process liquid that is recovered in the filtrate. Furthermore when a back wash is used to unclog filter media or when washing liquid is used to sluice out the solid matter or to clean critical surfaces before moving to the next step in the separation process then some of the valuable or harmful process liquid may be swept into highly diluted waste streams from which it is often overly expensive to recover the residual valuable or harmful liquid. Overall, although a large fraction of the original liquid is recovered by modern filtration systems, the waste matter still typically contains a significant quantity of the original liquid. If the original liquid is valuable or potentially harmful then costs increase and there may be greater health, safety and environmental (HSE) risks.

In some applications an inert fine granular substance including "filter aid", "pre-coat" and "body aid", referred to herein as variations of filter aid, is added to improve the performance of the filtration process by, for example, preventing blinding of the filter medium and/or increasing the permeability of the filter cake. Examples of such added filter aid substances include diatomaceous earth, perlite, cellulose and others. A filter cake is still formed and subsequently disposed of, however it now includes the added fine granular filter aid substance. Hence there is more solid waste to dispose of and greater loss, or at least a risk of greater loss, of valuable or harmful process liquid that is trapped in this waste. The associated costs and environmental risks arising from this increase in solid waste volume can be significant.

The use of filter aid substances also entails adding equipment to handle the filter aid and to introduce it into the filtration apparatus. Added costs are also incurred to purchase and store the filter aid and to operate and maintain the added equipment.

One common added step to comply with environmental regulations when filtration waste material is contaminated by toxic substances, which are often non-aqueous organic process liquids, is to destroy the harmful content of the waste material, e.g. by incineration, thermal oxidation, etc. This approach adds complexity, adds cost to comply with air emission regulations, potentially increases safety and environmental hazards, and results in total loss of the residual process liquid.

Another commonly encountered problem with filtration processes that produce a filter cake is that there can be a limit to the pressure differential that can be applied across the filter to maintain high filtrate flow rates. In many applications an increase in pressure differential can cause greater compression of the filter cake which can reduce its permeability and thereby significantly increase the resistance to flow of liquid through the cake. In these circumstances the increase in pressure, which typically requires greater expenditure to supply and operate the means of applying the higher pressure, may achieve limited or no benefit.

Because of the above noted drawbacks, including loss of process liquid and potential for HSE harm, there is a need for improved filtration processes and equipment in which no filter cake is formed and that achieve a greater degree of separation of valuable or harmful process liquids from slurries, thereby enabling greater recovery and reuse of these valuable or harmful process liquids as well as reduced contamination of the solid matter.

It is an object of the present invention to overcome some of the abovementioned difficulties, and to at least provide the public with a useful alternative.

Definitions

The definitions and meanings of certain terms used herein are as follows:

The term "mechanical component" as used herein means a physical part made of metal, plastic, ceramic or other solid material that is a part of an apparatus used to perform the invented process, or a sub-assembly of such parts.

The term "Filter Medium" as used herein means the suitably porous, substantially horizontal sheet, plate, membrane, layer or layers of solid material or the like, that in use blocks the passage of most or all of the solid particles in the feed slurry while allowing liquid to flow through it provided there is enough pressure difference acting across the Filter Medium to overcome resistance to the flow of the liquid through the Filter Medium. The Filter Medium is installed in the filtration reservoir (meaning the tank or similar container within which the filtration steps of the process take place) and includes sealing means, where necessary, to ensure that the liquid that flows from the upstream side to the downstream side of the Filter Medium passes through the Filter Medium. There may be multiple layers of the Filter Medium such that there are multiple disconnected portions of the upstream surface of the Filter Medium. In some applications a horizontally mounted two-sided filter disc type of Filter Medium is used, an example of which is the ceramic disc membrane described in U.S. Pat. No. 5,730,869, noting that both the upper and lower sides of such a two-sided filter disc are part of the upstream surface of the Filter Medium. In some applications the Filter Medium is stationary and in some other applications the Filter Medium is rotatable in a substantially horizontal plane about a substantially vertical axis of rotation.

The term "Outlet Chamber" as used herein means the chamber into which the filtrate enters after flowing through the Filter Medium.

The term "filtrate" as used herein means the liquid that flows through the Filter Medium.

The term "slurry" means any mixture of at least one liquid phase and a solid phase comprising finely divided solid particles.

The term "feed slurry" as used herein means the slurry that is treated by applying one or more steps of the process of the invention and that contains finely divided solid particles and at least one liquid phase that is substantially comprised of Process Liquid.

The term "slurry agitation means" is a means of causing significant relative motion between the Filter Medium and at least a portion of the slurry in close proximity to the upstream surface of the Filter Medium that is sufficient to prevent excessive accumulation of solid particles on the upstream surface of the Filter Medium. By way of example only the significant relative motion between slurry and the Filter Medium can be caused by moving an impeller or other type of agitator in a horizontal plane that is parallel to and in close proximity to the upstream surface of the Filter Medium or by moving the Filter Medium back and forth horizontally, or by rotating the Filter Medium about a vertical axis of rotation.

The term "Process Liquid" as used herein means the valuable or potentially harmful liquid that is at least partially separated from a feed slurry by applying one or more steps of the process of the invention. The Process Liquid may be a single substance (e.g. monoethylene glycol); a liquid mixture or solution of substantially miscible liquid substances; a liquid mixture or solution containing dissolved salts and/or other dissolved substances; or other mixtures and solutions that are in a liquid state. By way of example only in a feed slurry containing solid particles mixed with a liquid solution comprising several miscible oils, a miscible solvent, and dissolved salt, the solution of several miscible oils, miscible solvent, and dissolved salt is the Process Liquid (and in this particular example the Process Liquid is substantially non-miscible with water). By way of a second example only, in a feed slurry containing solid particles and a solution of one or more glycols, water, and dissolved salt, the solution of one or more glycols, water, and dissolved salt is the Process Liquid (and in this particular example the Process Liquid is substantially miscible with water). In most anticipated applications of the invention the liquid components of the Process Liquid are typically at least partially miscible in each other however the invention can also be used to treat feed slurries in which there are liquid components of the Process Liquid that are non-miscible with each other.

The term "Sweep Liquid" as used herein means the liquid that is used to displace the Process Liquid out of the feed slurry above the Filter Medium. The Sweep Liquid is less dense than the Process Liquid.

The term "Impeller" as used herein is a rotatable mechanical component that is capable of being rotated at or faster than the rotational speed needed to generate sufficient turbulence in at least a portion of the slurry that is close to the upstream side of the Filter Medium to prevent excessive accumulation of solid particles on the upstream surface of the Filter Medium. The Impeller is further capable of being rotated at or faster than the rotational speed needed to draw liquid into a central suction zone (akin to the suction zone of a rotating impeller in a centrifugal pump), and move slurry from the central suction zone radially outward and across at least a portion of the upstream surface of the Filter Medium. There are many possible designs for the Impeller such as by way of example: a flat disc; a disc with ridges or dimples or other non-flat features; an assemblage of one or more blades; or combinations thereof. The Impeller rotates within a plane that is close to and substantially parallel to a substantial portion of the upstream surface of the Filter Medium. For applications in which the upstream surface of the Filter Medium is divided into multiple layers, such as in a stack of two-sided filter discs, the Impeller may also have multiple parallel layers that each act on a layer of the upstream surface of the Filter Medium. In some applications the Impeller rotates in a plane that is parallel to and in close proximity to a stationary Filter Medium. In some other applications the Filter Medium is stationary and the Impeller is attached to a rotatable Housing that rotates about a vertical axis of rotation. In some other applications in which the Filter Medium rotates, there is no Impeller because the rotating Filter Medium provides the agitation needed to avoid excessive accumulation of solid particles on the upstream surface of the Filter Medium.

The term "Housing" as used herein means one or more mechanical components that together form a chamber that substantially encloses the upstream surface of the Filter Medium and at least a portion of the slurry that is in close proximity to the upstream surface of the Filter Medium. The Housing is adapted and dimensioned so that in use it helps to reduce the degree of mixing of Process Liquid with Sweep Liquid. The Housing has at least one large inlet opening that allows slurry to enter freely from the Inlet Chamber and flow into the central suction zone and then be moved by the rotating Impeller radially outward and across at least a portion of the upstream surface of the Filter Medium. The Housing has within it, or is connected to, recirculation means that in use allows a portion of the slurry, said portion of slurry herein termed recirculating slurry, to flow out of the Housing and back into the Inlet Chamber. The Housing also has at least one outlet means that in use allows slurry to flow out of the Housing and out of the filtration reservoir. In some applications the Housing is stationary and encloses a rotating Impeller and the Filter Medium is stationary. In some other applications the Impeller is attached to the Housing which rotates about a vertical axis of rotation and the Filter Medium is stationary. In some other applications the Filter Medium rotates and the Housing is stationary and there is no Impeller inside the Housing. In some other applications there may be no Housing where a Housing is not needed to prevent overmixing of Process Liquid with Sweep Liquid.

The term "slurry flow restriction" as used herein is comprised of one or more mechanical components that in use restricts the flow of recirculating slurry out of the Housing thereby creating a rise in fluid pressure in the slurry over the radially outer portion of the upstream surface of the Filter Medium, said rise in fluid pressure being sufficient to assist filtrate to flow through the Filter Medium. By way of example the slurry flow restriction can be a mechanical component that has a small size opening through which the recirculating slurry must pass while flowing from the Housing back to the Inlet Chamber.

The term "excessive accumulation of solid particles" as used herein in connection with solid matter accumulating on the upstream surface of the Filter Medium means a layer of solid particles that is sufficiently thick and/or densely packed to cause a significant undesirable increase in the resistance to flow of filtrate through the Filter Medium. A filter cake that significantly increases the resistance to flow of filtrate is one example of an excessive accumulation of particles.

The term "Interface Zone" as used herein means the liquid zone separating the Sweep Liquid layer and the Process Liquid layer below it.

The term "overmixing" as used herein in connection with Process Liquid mixing with Sweep Liquid means an excessive degree of mixing of Process Liquid with Sweep Liquid that results in an excessive loss of Process Liquid into the Sweep Liquid. If the Process Liquid is at least partially miscible with the Sweep Liquid this excessive loss can occur if there is excessive turbulence in the Interface Zone resulting in an excessive amount of Process Liquid dissolving into the Sweep Liquid layer. If the Process Liquid is substantially non-miscible with the Sweep Liquid excessive loss is still possible if the two liquids are prone to form stable emulsions and there is high enough turbulence near the interface between the Process Liquid and Sweep Liquid to cause long lasting emulsions of Process Liquid and Sweep Liquid.

The term "about" as used herein in connection with a referenced numeric indication means the referenced numeric indication plus or minus up to 10% of that referenced numeric indication. For example, the language "about 50" units covers the range of 45 units to 55 units.

The term "excessive" as used herein means high enough or large enough or severe enough to cause a significant degradation in the performance of the process or apparatus of the invention.

The term "substantially" as used herein means for the most part or to a significant degree or amount.

The term "comprises" as used herein means including but not necessarily limited to.

The term "substantially horizontal" as used herein means either horizontal or having a degree of slope or angle that does not significantly impair the performance of the process or apparatus of the invention.

The term "predominantly comprised" as used herein means more than about 80% comprised.

The term "persistent" as used herein means lasting longer than about 4 hours.

SUMMARY OF THE INVENTION

In a first aspect the invention provides a filtration process for separating Process Liquid from a feed slurry that comprises a mixture of the Process Liquid and solid particles, the process employing a Sweep Liquid that is less dense than the Process Liquid and at least partially miscible with the Process Liquid; including the steps of:

(a) introducing the feed slurry into an Inlet Chamber of a reservoir, said reservoir including i) a substantially horizontal Filter Medium that in use allows filtrate to flow through the Filter Medium while blocking the passage of most or all of the solid particles in the feed slurry through the Filter Medium, ii) a slurry agitation means that in use prevents an excessive accumulation of solid particles on the upstream surface of the Filter Medium, iii) a Housing which substantially encloses the upstream surface of the Filter Medium and at least a portion of the feed slurry that is in close proximity to the upstream surface of the Filter Medium, and iv) one or more mechanical components that in use prevent overmixing of Sweep Liquid and Process Liquid, and;

(b) introducing into the Inlet Chamber of the reservoir the Sweep Liquid in such a manner so as to avoid overmixing of Sweep Liquid and Process Liquid and to thereby create within the Inlet Chamber an upper layer of liquid primarily comprised of Sweep Liquid above a lower layer of liquid primarily comprised of Process Liquid and an Interface Zone between the two liquid layers, and;

(c) applying the slurry agitation means in such a manner so as to cause at least a portion of the feed slurry that is enclosed by the Housing to flow from a central suction zone radially outward and across at least a portion of the upstream surface of the Filter Medium and;

(d) allowing a recirculating portion of the slurry that flows radially outward across at least a portion of the upstream surface of the Filter Medium as a result of applying the slurry agitation means step (c) to flow out of the Housing through one or more Housing outlets and back into the central suction zone in such a manner so as to avoid causing overmixing of Process Liquid with the Sweep Liquid that is in the Inlet Chamber, and;

(e) applying a pressure differential across a substantial portion of the Filter Medium, wherein said pressure differential is sufficient to cause liquid to flow through the Filter Medium as filtrate, and;

(f) restricting the flow of a recirculating portion of slurry in such a manner so as to cause an increase in fluid pressure over a portion of the upstream surface of the Filter Medium, and to thereby assist filtrate to flow through the Filter Medium, and;

(g) applying one or more mechanical means of blocking, deflecting, dampening, reducing and/or avoiding excessive currents in the liquid in the Inlet Chamber that could otherwise excessively disturb the liquid in or proximate the Interface Zone between the layer of primarily Sweep Liquid and the layer of primarily Process Liquid and thereby cause overmixing of Sweep Liquid and Process Liquid, and;

(h) allowing the flow of liquid filtrate through the Filter Medium in accordance with steps (d), (e), (f) and (g) to continue until a sufficient portion of the Process Liquid has been displaced out of the feed slurry through the Filter Medium thereby forming a depleted slurry above the Filter Medium that is primarily comprised of solid particles and Sweep Liquid and is depleted of Process Liquid, and;

(i) recovering at least a portion of the filtrate from the reservoir.

In one embodiment the process further includes the step of adding a dispersing agent to the feed slurry.

In another embodiment the Process Liquid and the Sweep Liquid are substantially miscible with water. In another embodiment the Process Liquid is primarily comprised of one or more substantially non-polar liquids that are typically present in one or more of: crude hydrocarbon liquids; hydrocarbon fuels; other refined hydrocarbon liquids; organic polymers; organic coolants and cutting fluids used in metal cutting and metal forming; organic solvents used in metal extraction and refining; synthetic oil; organic liquors used in crystallisation processes; organic fluids used in the oil and gas industry including for drilling, hydraulic fracturing, work-overs, polymer flooding, and well clean-up; liquids contained in slurries removed from equipment and piping during descaling or cleaning operations; non-aqueous automotive and aircraft fluids; non-aqueous heat transfer fluids and hydraulic fluids; lubricating oils; organic liquids used during the manufacture of cosmetics, pharmaceuticals, plastics, other petrochemicals, pulp and paper products and electronics; toxic industrial liquid effluent components that are substantially non-miscible with water.

In another embodiment the Sweep Liquid is primarily comprised of one or more of; naphtha, natural gas liquids, pentane, hexane, heptane, white spirit, mineral turpentine, diesel, gasoline, other light hydrocarbon liquids, organic solvents, or a mixture thereof.

In another embodiment the process further includes the step of separating at least a portion of the Sweep Liquid from at least a portion of the depleted slurry thereby forming a treated slurry that is depleted of Sweep Liquid and depleted of Process Liquid.

In one embodiment the Housing and the Filter Medium are stationary and the slurry agitation means is an Impeller that in use is rotated within the Housing in a plane that is substantially parallel to and proximate the upstream surface of the Filter Medium.

In another embodiment the Housing is stationary and the slurry agitation means is the Filter Medium that in use is rotated in a substantially horizontal plane about a substantially vertical axis of rotation.

In a further embodiment the Filter Medium is stationary and the slurry agitation means is the Housing that in use is rotated about a substantially vertical axis of rotation and wherein the Housing is attached to and drives the rotation of an Impeller substantially parallel to and proximate the upstream surface of the Filter Medium.

In a second aspect the invention provides a filtration process for recovering Process Liquid that is at least partially miscible with water from a feed slurry that predominantly comprises a mixture of the Process Liquid and solid particles, the process employing a Sweep Liquid that is less dense than water, substantially non-miscible with water, less dense than the Process Liquid and substantially non-miscible with the Process Liquid; the process including the steps of:

(a) introducing the feed slurry into a reservoir above a substantially horizontal Filter Medium therein and wherein the Filter Medium is adapted and dimensioned to allow liquids to flow through it in use while blocking the passage of most or all of the solid particles in the feed slurry through the Filter Medium, and;

(b) introducing into the reservoir above the Filter Medium the Sweep Liquid in such a manner so as to create a layer of liquid that is primarily Sweep Liquid above a layer of liquid that is primarily Process Liquid and an interface between the two liquid layers, and;

(c) applying a pressure differential across a substantial portion of the Filter Medium, wherein said pressure differential is sufficient to cause liquid to flow through the Filter Medium as filtrate, and;

(d) preventing an excessive accumulation of solid particles on the upstream surface of the Filter Medium by agitating by an agitation means a portion of the slurry that is in close proximity to the Filter Medium, and;

(e) allowing the flow of liquid through the Filter Medium in step (c) and the prevention of excessive accumulation of solid particles onto the surface of the Filter Medium in step (d) to continue until a sufficient portion of the Process Liquid has been displaced out of the slurry through the Filter Medium thereby forming a depleted slurry above the Filter Medium that is primarily comprised of solid particles and Sweep Liquid and is depleted of Process Liquid, and;

(f) recovering at least a portion of the filtrate from the reservoir.

In one embodiment the process further includes the step of separating at least a portion of the Sweep Liquid from at least a portion of the depleted slurry thereby forming a treated slurry that is depleted of Sweep Liquid and depleted of Process Liquid.

In another embodiment the Sweep Liquid is primarily comprised of one or more of; naphtha, natural gas liquids, pentane, hexane, heptane, white spirit, mineral turpentine, diesel, gasoline, other light hydrocarbon liquids, organic solvents, or a mixture thereof.

In a further embodiment the process further includes the step of adding a dispersing agent to the feed slurry.

In one embodiment the agitation means is the movement of the Filter Medium, wherein the movement of the Filter Medium is sufficient to prevent excessive accumulation of solid particles on the upstream surface of the Filter Medium.

In another embodiment the agitation means is the movement of an agitator in close proximity to the upstream surface of the Filter Medium, wherein the movement of the agitator is sufficient to prevent excessive accumulation of solid particles on the upstream surface of the Filter Medium.

In one embodiment the step of separating at least a portion of the Sweep Liquid from at least a portion of the depleted slurry includes introducing a sufficient quantity of water into the reservoir below the Filter Medium such that the level of introduced water rises through the Filter Medium and lifts a substantial portion of the Sweep Liquid up and out of a substantial portion of the depleted slurry, thereby creating a layer of liquid primarily comprised of Sweep Liquid that floats on the introduced water, and a layer of slurry having water as its main liquid component.

In another embodiment the step of separating at least a portion of the Sweep Liquid from at least a portion of the depleted slurry includes removing at least a portion of the depleted slurry from the reservoir and placing water and said removed depleted slurry into a second reservoir in a manner so as to create an aqueous lower layer of liquid that is predominantly water and an upper layer of liquid that is predominantly Sweep Liquid that floats on the aqueous lower layer thereby allowing at least a portion of the solid particles that had been contained in the removed depleted slurry to accumulate in the aqueous lower layer of liquid.

In a further embodiment the step of separating at least a portion of the Sweep Liquid from at least a portion of the depleted slurry includes vaporising at least a portion of the Sweep Liquid.

In one embodiment the process further includes the step of applying vibrations including ultrasonic vibrations to the slurry above the Filter Medium wherein in use the vibrations aid the separation of Process Liquid from the surfaces of the solid particles.

In another embodiment the process further includes the optional step of applying vibrations including ultrasonic vibrations to the depleted slurry, wherein in use the vibrations aid the separation of Sweep Liquid from the surfaces of the solid particles.

In a third aspect of the present invention there is provided an apparatus for performing a filtration process for separating Process Liquid from a feed slurry that comprises a mixture of the Process Liquid and solid particles; the apparatus comprising:

a reservoir including a substantially horizontal Filter Medium that is adapted and dimensioned to allow filtrate to flow through it in use while blocking the passage of most or all of the solid particles in the feed slurry through the Filter Medium and an Inlet Chamber within the reservoir which is adapted and dimensioned to hold liquids and slurries on an upstream side of the Filter Medium, and;

a pressurising means which is capable of creating a pressure differential across the Filter Medium of sufficient magnitude so as to cause filtrate to flow through the Filter Medium, and;

one or more means of introducing slurry and liquid into the reservoir by which means feed slurry and Sweep Liquid can be introduced into the Inlet Chamber in such a manner so as to avoid overmixing of Sweep Liquid and Process Liquid, and to thereby create within the Inlet Chamber an upper liquid layer primarily comprised of Sweep Liquid above a lower liquid layer primarily comprised of Process Liquid and an Interface Zone between the two liquid layers, and;

a slurry agitation means that, in use, is adapted and dimensioned to provide sufficient agitation in close proximity to at least a portion of the upstream surface of the Filter Medium, to cause at least a portion of the slurry in the Inlet Chamber to flow radially outwards and across a portion of the upstream surface of the Filter Medium, said slurry motion being sufficient to prevent the excessive accumulation of solid particles on the upstream surface of the Filter Medium, and;

a Housing within the reservoir that substantially encloses at least a portion of the feed slurry that is in close proximity to the upstream surface of the Filter Medium, and a means within the Housing that in use enables a recirculating portion of the slurry that flows outwardly across at least a portion of the upstream surface of the Filter Medium as a result of the agitation means to flow out of the Housing and then directly or indirectly back into the central suction zone without excessively disturbing the Interface Zone between the layer of primarily Sweep Liquid and the layer of primarily Process Liquid, and;

a slurry flow restriction means that in use restricts the flow of the recirculating portion of slurry out of the Housing through one or more Housing outlets to thereby cause the fluid pressure over a portion of the upstream surface of the Filter Medium to rise and to thereby assist filtrate to flow through the Filter Medium, and;

one or more mechanical components that, in use, reduce the degree of mixing of the Sweep Liquid and Process Liquid while the agitation means is in use by blocking, dampening, deflecting and/or avoiding excessive currents in the liquid in the Inlet Chamber, said excessive currents if otherwise present and not blocked, dampened, deflected, and/or avoided being capable of causing overmixing of Sweep Liquid and Process Liquid by excessively disturbing the Interface Zone, and;

a first outlet means adapted to allow filtrate to flow out of the reservoir, and;

a second outlet means adapted to allow slurry to flow out of the reservoir.

In one embodiment the one or more mechanical components that, in use, while the Impeller is immersed in liquid and rotating, reduce the degree of mixing of Sweep Liquid and Process Liquid by blocking, dampening, deflecting and/or avoiding excessive currents in the liquid in the Inlet Chamber comprise one or more of: tapered surfaces in the reservoir above the Filter Medium, such as a cone or arrangement of baffles or similar, that direct a substantial portion of the liquid that is moving downwards towards the Filter Medium to preferentially flow towards the central suction zone; substantially horizontal plates that redirect the flow of the recirculating portion of slurry in such a manner so as to avoid excessive upwardly moving currents in the liquid in the Inlet Chamber; plates, baffles, perforated screens, a loose layer of beads or stones or other solid matter the means being placed over or suspended above at least a portion of the Filter Medium in such a manner so as to block, deflect, dissipate or dampen upwardly moving currents generated by the rotating Impeller when in use.

In another embodiment the agitation means is an Impeller inside the reservoir that, in use, is adapted and dimensioned to rotate at sufficient speed about a substantially vertical axis of rotation within a plane that is substantially parallel to and in close proximity to at least a portion of the upstream surface of the Filter Medium, wherein the Impeller when immersed in slurry and rotating at sufficient speed causes at least a portion of the slurry in the Inlet Chamber to flow into an central suction zone located around the vertical axis of rotation, then radially outwards and across a portion of the upstream surface of the Filter Medium, said slurry motion being sufficient to prevent the excessive accumulation of solid particles on the upstream surface of the Filter Medium.

In a further embodiment the agitation means is the Filter Medium that in use, is adapted and dimensioned to move at sufficient speed to cause at least a portion of the slurry in the Inlet Chamber to flow across a portion of the upstream surface of the Filter Medium, said slurry motion being sufficient to prevent the excessive accumulation of solid particles on the upstream surface of the Filter Medium.

In another embodiment the Filter Medium is adapted and dimensioned to rotate at sufficient speed to cause at least a portion of the slurry in the Inlet Chamber to flow radially outwardly across a portion of the upstream surface of the Filter Medium, said slurry motion being sufficient to prevent the excessive accumulation of solid particles on the upstream surface of the Filter Medium.

Further aspects and embodiments of the invention will become apparent from the following description.

DETAILED DESCRIPTION OF THE INVENTION

It is an object of the present invention to substantially improve the performance of filtration processes used to separate valuable or harmful Process Liquid from feed slurries that comprises Process Liquid and solid matter in the form of finely divided solid particles, and in particular to enable the efficient recovery of essentially all of the Process Liquid from said feed slurries.

In so doing the process the invention avoids or minimizes the following problems: the release of harmful or valuable substances into the environment; the purchase of new Process Liquid to replace what was lost with the waste solids; and the cost and complexity of equipment and systems to recover Process Liquid from the waste solid material.

It is an additional object of the invention to at least provide the public with a useful alternative to available methods.

Aspects and embodiments of the invention will become apparent from the following detailed description and Figures.

Figure 1:
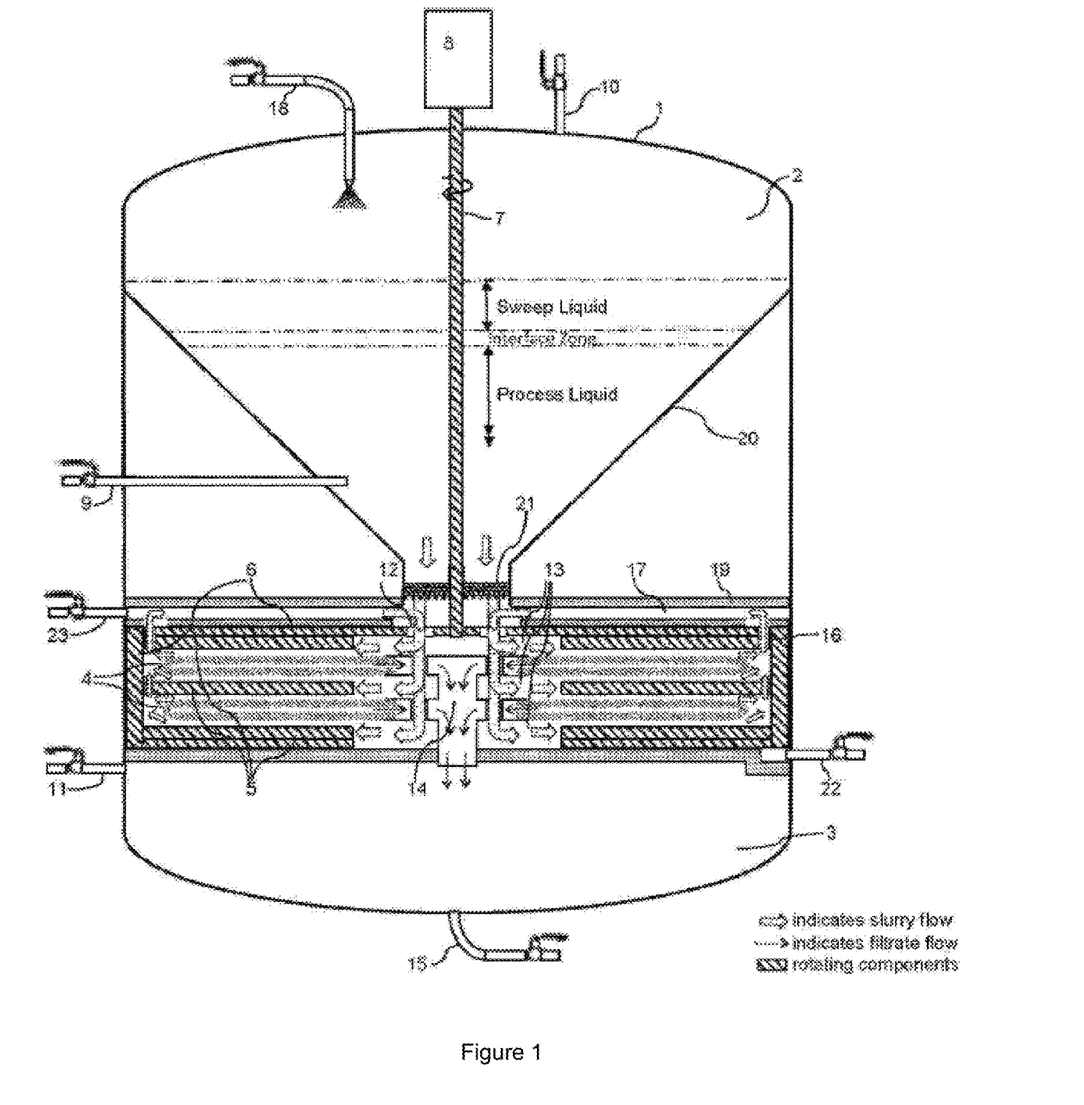
FIG. 1 shows a cross sectional view of one embodiment of the apparatus of the invention having an Impeller attached to a rotatable Housing and a stationary Filter Medium comprised of two circular two-sided filter discs, used to recover Process Liquid from slurries by employing a Sweep Liquid that is at least partially miscible with the Process Liquid.

FIG. 1 shows one embodiment of an apparatus suitable to perform the process of the invention. Referring to FIG. 1, the process takes place in reservoir 1 having an Inlet Chamber 2 on the upstream side of a horizontal Filter Medium 4 and an Outlet Chamber 3 on the downstream side. Typically, but not necessarily, the Outlet Chamber forms a part of the reservoir within which the filtration steps of the process of the invention take place. However there are also embodiments in which two-sided filter discs are used (refer FIG. 2) and the filtrate enters a filtrate collection zone or chamber that is attached to the filter discs. A skilled person can envisage that the filtrate could flow from there directly out of the reservoir without falling into a separate chamber within the reservoir. In these cases the term Outlet Chamber includes the filtrate collection zone or chamber that is attached to the Filter Medium.

Figure 2:
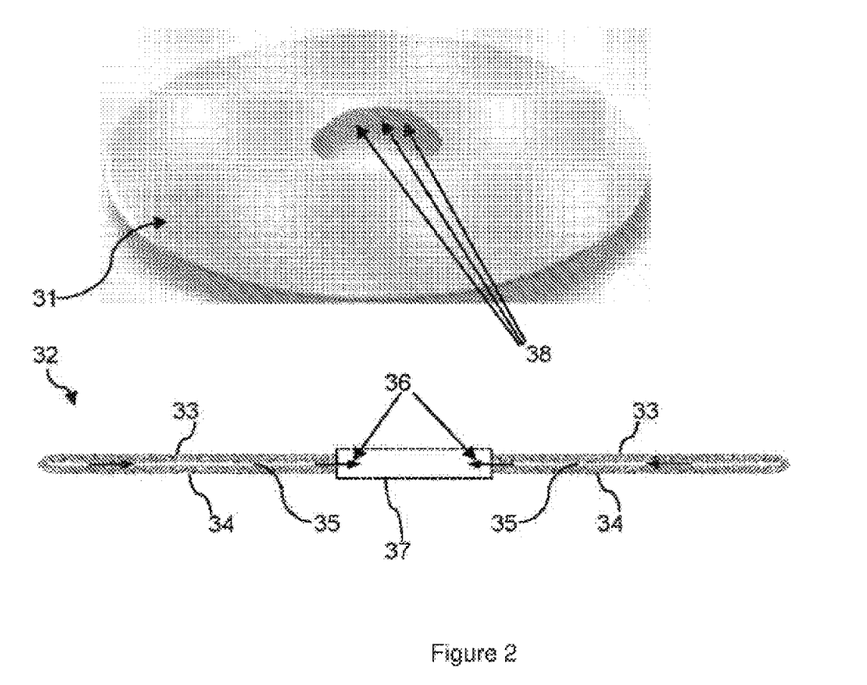
FIG. 2 shows a perspective view and a cross sectional view of an example of a circular two-sided filter disc type of Filter Medium that can be used in the apparatus shown in FIG. 1 and further shows liquid flow through this type of Filter Medium.
Figure 3:
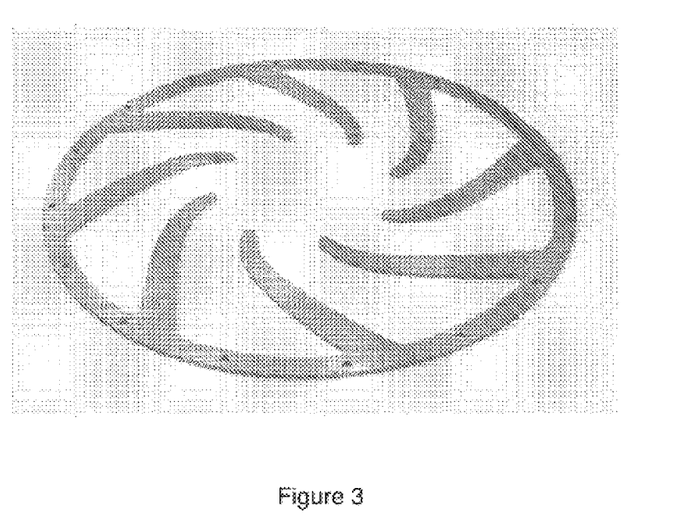
FIG. 3 shows a perspective view of an example of an impeller rotor that can be used in the apparatus shown in FIG. 1.

In this particular configuration the Filter Medium 4 is comprised of two horizontal tiers, each tier comprising a circular ceramic filter disc type of filter element as illustrated further in FIG. 2. Liquid can flow through each filter disc from both the upper and lower sides, hence the upstream surface of Filter Medium 4 is comprised of four surfaces, namely the upper and lower surfaces of each of the two filter discs. Other arrangements of filter elements are also feasible, including a single level filter element such as a porous plate, membrane or fabric in which the top side forms the upstream surface of the Filter Medium 4. Alternatively the apparatus shown in FIG. 1 can be modified to include any practicable number of filter discs arranged in a stack of horizontal tiers with suitable gaps between tiers so that slurry has easy access to essentially all of the upstream surface of the Filter Medium 4. In the apparatus shown in FIG. 1 there is a three part Impeller 5 attached to a rotatable Housing 6. The top part of Impeller 5 is a rotor over the upper surface of the top filter disc, the middle part is a rotor in the gap between the two filter discs, and the lower part is a rotor beneath the lower surface of the lower filter disc. FIG. 3 shows an example of an Impeller rotor suitable for use in the apparatus shown in FIG. 1. The three rotors of the Impeller are attached to Housing 6 which is in turn attached to Impeller shaft 7 and drive mechanism 8. Other Impeller arrangements are also feasible, however it is usually preferable to match the size and number of Impeller rotors to the size and number of filter elements in the Filter Medium so that the maximum upstream area of the Filter Medium is exposed to the turbulence created by the rotors in the rotating Housing. It is for this reason that there are three rotors in the apparatus shown in FIG. 1. In some other configurations of the apparatus the Filter Medium may instead be comprised of a horizontal porous plate, membrane or fabric in which case sufficient slurry agitation can be achieved using a single rotor that rotates in a horizontal plane above the porous filter plate or cloth.

In some applications there is a stationary Filter Medium and a separate Impeller rotating within a stationary Housing. A skilled person can envisage that there is no requirement that the Impeller be attached to the Housing in all applications of the process or apparatus of the invention. For example, in applications in which the Filter Medium is a stationary horizontal porous plate, membrane or fabric, an Impeller enclosed by a stationary Housing and comprised of an assembly of horizontal radial blades and rotating in a plane parallel to and close to the upstream surface of the Filter Medium can generate sufficient turbulence to prevent excessive accumulation of solid particles on the surface of the Filter Medium.

In some applications the feed slurry to be treated has a low solids content, in which case the apparatus can first be used to thicken the slurry before Sweep Liquid is used. In this initial thickening phase feed slurry enters through inlet 9 and fills the Inlet Chamber 2 until the Housing is well submerged and the slurry level is high enough to enable satisfactory operation of the apparatus. A pressure differential is applied across the Filter Medium 4 by, for example, pressurizing the Inlet Chamber 2 using connection 10 or pulling a vacuum in the Outlet Chamber 3 using connection 11. The pressure differential causes filtrate to flow through the Filter Medium 4 and into the filtrate collection chamber 14 and from there into the Outlet Chamber 3. The Housing and attached impeller rotors are rotated via drive mechanism 8 and shaft 7 so as to create a pumping action that draws feed slurry downward 15 from the Inlet Chamber 2 through the Housing inlet openings 12 and into the central suction zone 13 and from there radially outward across the upstream surface of the Filter Medium 4. The central suction zone in FIG. 1 has three tiers, one for each of the three Impeller rotors. The movement of the slurry caused by the rotating Impeller rotors prevents solid particles from forming a significant filter cake on the upstream surface of the Filter Medium 4. Minor accumulations may be acceptable where there is little liquid turbulence provided these accumulations do not cover a significant portion of the upstream surface of the Filter Medium 4.

The prevention of the formation of a filter cake enables a given pressure differential across the Filter Medium to generate a substantially higher filtrate flow rate. This feature can allow the use of filter elements with particularly small pore size without suffering a drop in filtrate flow, which can be useful in reducing the cut size of particles that can be tolerated in the feed slurry.

During the thickening phase there is no Sweep Liquid hence operation with particularly high turbulence is acceptable if this increases filtrate flow.

A recirculating portion of the moving slurry flows out of the Housing through a small outlet 16 and through horizontal channel 17 and back through the Housing inlet opening 12 where it mixes with more slurry being drawn downwards from the Inlet Chamber 2. The size of the outlet 16 is small enough to restrict the flow of slurry through it. This flow restriction combined with the pumping action created by the rotating Impeller 5 causes an increase in the fluid pressure in the slurry in contact with the radially outer portions of the upstream surface of Filter Medium 4, akin to the rise in fluid pressure that occurs at the outlet of a centrifugal pump when the connected piping or valves restrict the flow. This rise in fluid pressure acting on a portion of the Filter Medium 4 can provide a useful boost to the flow of filtrate.

This boost in filtrate flow due to the centrifugal forces created by Impeller rotation is of particular interest with the apparatus configuration shown in FIG. 1. In conventional arrangements of the ceramic filter discs shown in FIG. 1 and FIG. 2 the discs are stacked on a hollow shaft which is rotated. The stack of filter discs rotates within a stationary chamber. Within each filter disc filtrate flows inwards, as can be seen in FIG. 2, through internal filtrate channels. The filtrate from all the rotating discs is collected in the hollow shaft. The disc rotation is intended to prevent the formation of a thick filter cake. However, because the discs themselves are rotating, there are centrifugal forces that push outward against the inward flow of filtrate in the internal filtrate channels of each disc. Additional external fluid pressure must be applied to the upstream surface of the filter discs to overcome the centrifugal forces so that the filtrate can flow inwards towards the hollow shaft. The apparatus of the present invention does the opposite by rotating an impeller on the outside of the filter discs and leaving the filter discs fixed in position. The rotating Impeller 5 in FIG. 1, when rotating at high speed thereby significantly assists rather than fights against the flow of filtrate. For example, using the apparatus in FIG. 1 with a commercially available 374 mm dia ceramic filter disc supplied by Kerafol of Germany, an externally applied pressure differential of 1.0 bar and an Impeller rotation of 1000 rpm, the average TMP (transmembrane pressure) across the disc would be 2.1 bar comprised of the 1.0 bar of external pressure plus 1.1 bar of pressure boost due to the rotation of the impeller. By comparison, when using the prior art conventional arrangement of this type of filter disc with 1.0 bar external pressure and rotating such discs at 1000 rpm, the filtrate flow would be negligible because the filter disc rotation would create a negative average TMP of about 1.1 bar which offsets the applied external pressure of 1.0 bar. In order to match the effective TMP and filtrate flow rate of the apparatus of the present invention the external pressure using the conventional design would have to be raised from 1.0 bar to 3.2 bar.

In some applications it may be sufficient or preferable to operate without creating the above described boost to the pressure differential across the Filter Medium caused by high speed Impeller rotation. For example the fine solid particles may be friable and prone to breakage into even finer particles, or the high Impeller speed might lead to accelerated erosion, or satisfactory performance may be achievable with less vigorous slurry movement within the Housing. In these cases it may be preferable to use another embodiment in which the Filter Medium rotates, as shown in FIG. 5.

Figure 5:
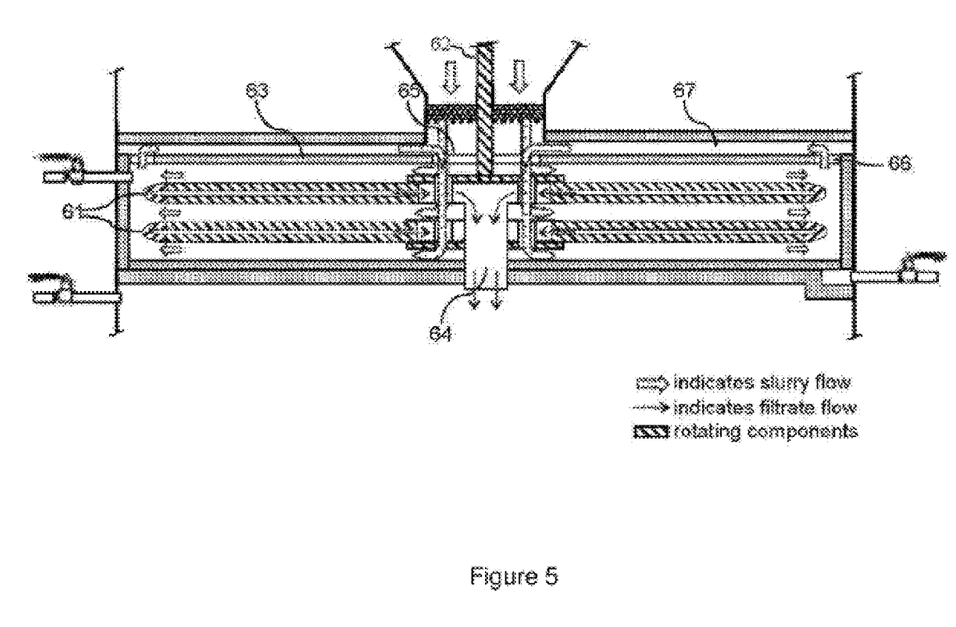
FIG. 5 shows one embodiment of the apparatus of the invention having a rotatable Filter Medium comprised of two circular two-sided filter discs enclosed within a stationary Housing, used to recover Process Liquid from slurries by employing a Sweep Liquid that is at least partially miscible with the Process Liquid.

FIG. 5 shows the differences between this embodiment in which the Filter Medium rotates and the FIG. 1 apparatus. The undescribed parts of the apparatus used for this embodiment are essentially the same as those shown in FIG. 1. Referring to FIG. 5, the circular filter discs 61 (and not the Housing 63) are connected to the shaft 62 and drive mechanism and there is no Impeller. A skilled person can envisage that by rotating the circular filter discs 61 within a now stationary Housing 63 there will be shear forces acting across the surfaces of the filter discs 61 that prevent the excessive accumulation of solid particles. The stationary Housing 63 can also be modified to include blades that protrude into the gaps between the rotating filter discs 61 that can help to create more turbulence. Despite the absence of a dedicated impeller a skilled person can envisage that the rotating filter discs would themselves create some degree of pumping action by tending to throw the slurry that is in contact with its surfaces outward, thereby creating some radially outward flow of slurry across the surfaces of the filter discs 61 a portion of which would be recirculating slurry that then flows out of the Housing 63 through a substantially non-restrictive opening 66 and back inward through horizontal channel 67 and then through the Housing inlet opening 65. Filtrate would be collected in filtrate collection chamber 64 and from there be conducted to the Outlet Chamber (or be piped directly out of the reservoir—refer description of Outlet Chamber under Definitions). The upstream surface of the filter discs 61 can have raised radially aligned features such as one or more ridges or blades attached to it so as to increase the pumping action created when the filter discs rotate.

The thickening phase as described above continues until the average solids content in the slurry reaches a target level of preferably at least 10 wt % and more preferably at least 30 wt %.

The Sweep phase then begins by introducing Sweep Liquid into the Inlet Chamber 2 through Sweep Liquid inlet 18 which includes a spray head to create a fine mist or spray that gently settles onto the surface of the Process Liquid in the feed slurry in the Inlet Chamber 2 thereby creating a layer of mostly Sweep Liquid floating on top of a layer of mostly Process Liquid even if the Sweep Liquid is wholly miscible with the Process Liquid, as demonstrated by the prior art including U.S. Ser. No. 13/823,213. If the Sweep Liquid and Process Liquid are at least partially miscible in each other there will be an Interface Zone between the two liquids that contains a mixture of Sweep Liquid and Process Liquid and it is important to avoid excessively disturbing the liquids in or close to the Interface Zone so as to avoid increasing the degree of mixing of Process Liquid with Sweep Liquid because they will remain mixed together thereafter, resulting in an unwanted loss of Process Liquid into the Sweep Liquid or an unwanted degree of contamination or dilution of the Process Liquid filtrate with Sweep Liquid.

The rotating Impeller creates turbulence hence the apparatus, when used with Sweep Liquid that is at least partially miscible with the Process Liquid, includes means of preventing overmixing of Process Liquid with Sweep Liquid including components that block, deflect, dampen, dissipate or avoid unwanted currents in the Inlet Chamber that could otherwise disturb the liquids in or close to the Interface Zone and thereby cause overmixing of Process Liquid with Sweep Liquid. Examples of components that block, deflect, dampen, dissipate or avoid unwanted currents in the Inlet Chamber 2 that could otherwise disturb the liquids in or close to the Interface Zone include, but are not limited to:

tapered surfaces in the Inlet Chamber, such as a cone or arrangement of baffles or similar, that cause at least a portion of the liquid that is moving towards the Filter Medium to preferentially flow towards the central suction zone, horizontal surfaces near, or forming part of, the Housing that redirect the flow of recirculating slurry horizontally back towards the central suction zone, perforated plates, baffles, a loose layer of beads or balls or stones or other solid matter and the like placed above at least a portion of the Filter Medium, that are designed to deflect, dissipate or dampen excessive upwardly moving currents that under some circumstances could emanate from the Housing when the Impeller is rotating.

It is for these reasons that the apparatus in FIG. 1 includes the following components:

a horizontal plate 19 that directs the recirculating slurry horizontally back toward the Housing inlet opening 12 a feed cone 20 that guides the feed slurry towards the Housing inlet opening 12 a perforated plate and a layer of loose balls 21 located above the entrance to the Housing.

The inventor has observed by experimentation that some broad upward currents and circular horizontal currents in the liquid near the Interface Zone do not cause overmixing of Process Liquid with Sweep Liquid. Some turbulence is acceptable (and in some cases desirable as discussed later) even to the extent of creating waves in the Interface Zone provided that particularly high velocity streams of liquid near the Interface Zone are avoided. The above described measures including the perforated plate and layer of loose balls 21 achieve this by dampening and distributing the energy in upwardly moving liquid streams created by the rotating Impeller 5. Experiments by the inventor have shown that the above described measures to avoid overmixing of Process Liquid with Sweep Liquid work well in applications where the Process Liquid is wholly miscible with water, such as monoethylene glycol (MEG), and the Sweep Liquid is ordinary tap water.

The filtration process with Impeller rotation continues during the Sweep phase. If necessary the speed of Impeller rotation can be reduced to reduce the degree of mixing of Process Liquid with Sweep Liquid. The flow of filtrate causes a reduction in the volume of Process Liquid in the Inlet Chamber 2 thereby causing the Interface Zone to descend. As the Interface Zone descends the diameter of the feed cone 20 decreases, hence, because the volume of the Interface Zone remains the same (or grows if mixing is occurring) its thickness must increase. This is useful because it increases the vertical separation between the Sweep Liquid layer and the Process Liquid layer, which helps to reduce the risk of further mixing of Process Liquid with Sweep Liquid.

The average concentration of particles in the Process Liquid typically rises because the quantity of particles above the Filter Medium remains essentially fixed while the volume of Process Liquid decreases, however this rise in solids concentration is limited by turbulence and/or the use of a dispersing agent (as described below). Hence the descending Sweep Liquid layer eventually descends through the slurry. The inventor has observed that when this happens the Sweep Liquid surprisingly displaces Process Liquid out of the slurry from the top down, causing more and more solid particles to be immersed in Sweep Liquid instead of Process Liquid. The particles cannot pack down because of turbulence (plus optionally the effect of a dispersing agent), hence they remain as suspended fine freely moving separate particles while the Sweep Liquid layer descends at a rate that is proportional to the filtrate flow rate. The slurry is extremely permeable, being primarily liquid, hence the Sweep Liquid can descend in a horizontal front and strip denser Process Liquid from the surfaces of the particles without overmixing with Process Liquid even if the Process Liquid is wholly miscible with the Sweep Liquid.

If needed high frequency vibrations, such as ultrasonic vibrations, can be applied to the slurry to aid the separation of Process Liquid from the surfaces of the solid particles.

During the Sweep phase of operation more Sweep Liquid can be added above the Interface Zone if required. More feed slurry can also be added below the Interface Zone using slurry inlet 9.

During the Sweep phase of operation by the time the Interface Zone reaches the Housing typically most of the Process Liquid that had been in the feed slurry has now been recovered in the filtrate and most of the remaining Process Liquid is inside the Housing while the remaining liquid in the Inlet Chamber is predominantly Sweep Liquid. Filtration and Impeller rotation can still continue noting that the Sweep Liquid that enters the Housing is thoroughly mixed with the Process Liquid therein. However this mixing applies to the small amount of Process Liquid that is in the Housing, which is a small fraction of the total amount of Process Liquid treated by the process and apparatus of the invention. Hence, even if the Process Liquid and Sweep Liquid are wholly miscible in each other, the degree of overall dilution of Process Liquid by Sweep Liquid is very low.

For example in an application in which 10 $m^3$ of feed slurry comprised of a Process Liquid made up of 8 $m^3$ of mono-ethylene glycol (MEG) in solution with about 2 $m^3$ of water, and having 1% solid matter as finely divided particles, the apparatus would be used initially for thickening. Experiments by the inventor indicate that thickening to 20% solids is readily achievable while maintaining a high filtrate flow rate. The thickened slurry, now having a volume of about 0.5 $m^3$, contains about 0.4 $m^3$ of MEG and 0.1 $m^3$ of water and about 7.6 m³ of MEG will have been recovered as filtrate. Experiments by the inventor indicate that a Sweep Liquid ration of about 1.0 is suitable with such a thickened slurry hence in this example about 0.5 m³ of water would be added as Sweep Liquid to the Inlet Chamber 2 using the spray inlet 18 and taking appropriate care to avoid overmixing with the MEG. Filtration and Impeller rotation continues and causes the Interface Zone to descend and pass through the upper part of the slurry in the feed cone 20. By the time the Interface Zone reaches the Housing another 0.3 m³ of MEG will have been recovered as filtrate, leaving about 0.1 m³ of MEG remaining in the Housing and the Interface Zone. At this stage over 98% of the initial 8 m³ of MEG has been recovered and most of the thickened slurry has been stripped of MEG, noting that most of the solid particles are now in a loose slurry in water in the feed cone 20 leaving a small tail quantity of slurry at the bottom of the feed cone 20 and in the Housing 6 to treat. At this stage the Impeller 5 rotation can be slowed to avoid overly rapid drawdown of liquid from the feed cone 20 and although this reduces the filtrate flow rate it also reduces the dilution of filtrate with Sweep Liquid. To achieve maximum recovery of MEG this slower rate of filtration continues until the all the Sweep Liquid has been used to recover essentially all of the original 8 m³ of MEG with potentially about 1 to 2% dilution with water caused by the mixing of Sweep Liquid into the filtrate.

In general terms the Sweep phase continues until the desired amount of Process Liquid has been recovered in the filtrate. At this stage the slurry, herein termed "depleted slurry" that has consequently formed above the Filter Medium is predominantly comprised of Sweep Liquid and solid matter. In some applications it may be preferable to continue the filtration after the desired amount of Process Liquid has been separated and recovered as filtrate. By continuing with Impeller rotation and filtration the composition of the filtrate would switch from primarily Process Liquid to primarily Sweep Liquid. Sweep Liquid would collect in the Outlet Chamber 3 from which it can be recovered. This will thicken the depleted slurry which can reduce the volume of waste slurry to dispose of or can make it easier to recover Sweep Liquid from the depleted slurry, as discussed in the next paragraph. Experiments by the inventor indicate that the depleted slurry can be thickened to over 50% while maintaining high filtrate flow rates.

If the Sweep Liquid is water, or another low value non-harmful substance the depleted slurry may be readily disposed of as is. However if the Sweep Liquid is, for example, a light hydrocarbon liquid it may be preferable to recover at least some of the Sweep Liquid from the depleted slurry. This can be done using the apparatus shown in FIG. 1. Typically the particular hydrocarbon liquid that would have been selected for use as a Sweep Liquid would have known composition and properties and be insoluble in water and less dense than water. In such cases the depleted slurry can usually be washed by adding water from below the Filter Medium through connection 22 to a level at least partway up the feed cone 20 in the Inlet Chamber 2. A large portion of the Sweep Liquid would be lifted out of the depleted slurry as the water passes through the Housing. If necessary the Impeller 5 can be rotated to agitate the slurry and help the water to strip Sweep Liquid from the surfaces of the particles. If necessary a suitable chemical can be added to the added water to help break adhesion or attraction forces that may be binding the Sweep Liquid to the solid particles. Most or all of the Sweep Liquid would rise and form a liquid layer in the feed cone 20 floating on the added water, from which it can be readily recovered. If needed high frequency vibrations including ultrasonic vibrations can also be applied to the depleted slurry to further aid the separation of Sweep Liquid from the surfaces of the solid particles. The liquid in the slurry left behind in the apparatus would be primarily water, which usually facilitates simple disposal of the slurry.

Slurry can be removed from the apparatus in FIG. 1 through connection 23 or 22 at any time during or after the thickening phase or Sweep phase of operation.

FIG. 2 shows an image and diagram of a ceramic circular two-sided filter disc. Referring to the photographic image 31 and the diagram 32 in FIG. 2, the filter disc has an upstream surface comprised of a topside surface 33 and an underside surface 34 through which filtrate can flow provided there is sufficient pressure differential applied between the upstream and downstream side of the Filter Medium. The effective pore size of the upstream surfaces 33 and 34 blocks the passage of most or all the particles in the feed slurry through the Filter Medium. There is at least one internal filtrate passage 35 through which the filtrate flows 36 towards the central filtrate collection zone 37. Some of the openings 38 from the internal filtrate passages 35 are visible in the photographic image 31. The filtrate collection zone 37 is part of the downstream side of the Filter Medium. The filter discs are installed with sealing means (not shown) to prevent solid particles from entering the central filtrate collection zone 7.

FIG. 3 shows a photographic image of an example of one of the three impeller rotors that can be used in the apparatus shown in FIG. 1. A skilled person can readily envisage that when the rotor as shown is immersed in slurry and rotating clockwise at sufficient speed in the gap between circular filter discs of the type shown in FIG. 1 and FIG. 2, the curved blades of the rotor will push slurry outwards across at least a portion of the upstream surface of the Filter Medium thereby preventing excessive accumulation of solid particles onto the upstream surface of the Filter Medium akin to the rotating impeller in a centrifugal pump. It is further apparent that if the rotation speed of the rotor shown in FIG. 3 is high enough and the flow of recirculating slurry out of the Housing is restricted then centrifugal forces will cause the fluid pressure in the slurry being moved by the outer parts of the blades of the rotor to rise and thereby provide a useful boost to filtrate flow through the adjacent portions of the upstream surface of the Filter Medium.

Figure 4:
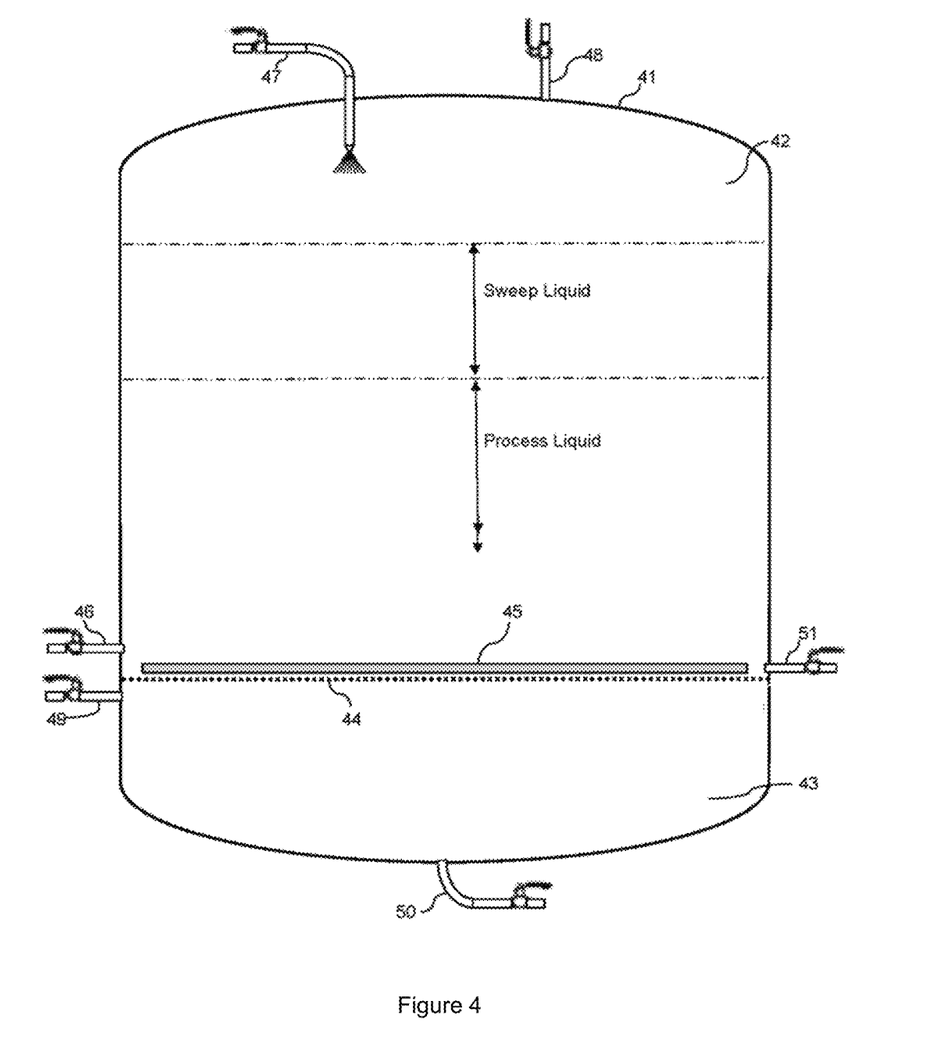
FIG. 4 shows a cross sectional view of an alternative embodiment of the apparatus of the invention having a single layer Filter Medium and used to recover Process Liquid that is substantially water miscible from slurries by employing a Sweep Liquid that is substantially non-miscible with the Process Liquid.

FIG. 4 shows an example of an alternative apparatus which in some applications can be suitable for the treatment of slurries in which the Process Liquid is at least partially water miscible and the selected Sweep Liquid is non-miscible with the Process Liquid. It can also be preferable for the Sweep Liquid to not be prone to form long lasting emulsions with the Process Liquid if the two liquids are mixed together. An example is the use of hexane to thoroughly separate and recover glycol from a feed slurry containing fine solid matter. In this case there is little concern if there is turbulence that causes the Sweep Liquid and Process Liquid to mix because the two liquids will readily separate when the turbulence ceases. For this reason the apparatus in FIG. 4 is simpler than the apparatus shown in FIG. 1.

Referring to FIG. 4, the process takes place in a reservoir 41 in which there is an Inlet Chamber 42, above the Filter Medium 44 and an Outlet Chamber 43 below. A connection 48 enabling the application of high pressure to the upstream side of the Filter Medium 44, a connection 49 to a source of vacuum, a Sweep Liquid inlet 47, a filtrate outlet 50, and a slurry outlet 51 are also present. In this particular configuration the Filter Medium 44 is a horizontal porous plate, membrane or fabric. A drive mechanism (not shown) moves agitator 45 in a horizontal plane close to the top surface of the Filter Medium 44 thereby continuously moving slurry across the surface of the Filter Medium 44 and preventing the formation of a filter cake or other excessive accumulation of solid matter on a significant portion of the upstream surface of the Filter Medium 44. By way of example only agitator 45 may be a linear type that moves back and forth over the Filter 30 Medium or a rotor comprised of radial blades that rotates above the Filter Medium.

The apparatus shown in FIG. 4 can optionally be initially used to thicken the feed slurry without Sweep Liquid present. Feed slurry is introduced into the Inlet Chamber 42 through inlet 46 up to a high enough level to allow the apparatus to function satisfactorily. The agitator 45 is moving. A pressure differential is applied across the Filter Medium 44 to cause filtrate to flow through it and collect in the Outlet Chamber 43. Filtration and agitator motion continue until the slurry has been sufficiently thickened, preferably to a solid content of at least 10 wt % and more preferably 30 wt %. After the slurry has been thickened the Sweep phase of operation begins by introducing Sweep Liquid into the Inlet Chamber 42 through spray inlet 47 to form a layer of Sweep Liquid above the layer of Process Liquid in the thickened feed slurry, noting that although this apparatus is intended for use with a Sweep Liquid that is substantially non-miscible with the Process Liquid it can be preferable to introduce the Sweep Liquid as a spray so as to avoid forming an emulsion with the Process Liquid. Filtration and agitation continue until the Sweep Liquid displaces the Process Liquid out of the thickened feed slurry, through the Filter Medium and into Outlet Chamber 43 thereby producing a depleted slurry that is primarily comprised of Sweep Liquid and solid particles above the surface of the Filter Medium 44.

In another embodiment the apparatus of FIG. 4 is modified such that the Filter Medium moves and the agitator is not required in this embodiment. For example one or more two-sided circular filter discs of the type shown in FIG. 2 can be attached to a vertical shaft and drive mechanism and installed in the FIG. 4 apparatus when there is no agitator. The circular filter discs would be rotated in either direction, or would oscillate between clockwise and counter clockwise rotation. Alternatively a Filter Medium comprised of a porous plate, membrane or cloth can be oscillated horizontally back and forth. A skilled person can envisage that by using these types of Filter Medium and moving them in these ways, sufficient shear forces and turbulence can be created so as to prevent excessive accumulations of solid particles on the surface of the Filter Medium.

In some applications using the apparatus of FIG. 4, when the Process Liquid has been displaced out of the feed slurry to create the depleted slurry, the depleted slurry will have a low solid content mainly because the solid particles will have been well distributed in the Inlet Chamber 42 due to agitator motion. It would typically then be preferable to continue the filtration after the Process Liquid has been separated from the slurry and recovered as filtrate. By continuing with filtration and agitator motion the composition of the filtrate would switch from primarily Process Liquid to primarily Sweep Liquid. Sweep Liquid would collect in the Outlet Chamber 43 from which it can be recovered through connection 50. This will thicken the depleted slurry which can reduce the volume of depleted slurry which can make it easier to recover Sweep Liquid from the depleted slurry, as discussed in the next paragraph.

If the Sweep Liquid is, for example, a light hydrocarbon liquid it may be desirable to recover at least some of the Sweep Liquid from the thickened depleted slurry. This can be done using the apparatus shown in FIG. 4. Typically the particular hydrocarbon liquid that would have been selected for use as a Sweep Liquid would have known composition and properties and be insoluble in water and less dense than water. In such cases the Sweep Liquid can be upwardly displaced out of the depleted slurry adding water from below so that the water level rises up through the Filter Medium 44 and up to a suitable higher level. The rate of water addition is controlled to avoid excessively expanding the thickened slurry. The agitator 45 could also be operating to agitate the slurry and assist the water to strip Sweep Liquid from the surfaces of the particles. If necessary a suitable chemical can be added to the added water to help break adhesion or attraction forces that may be binding the Sweep Liquid to the solid particles. Most or all of the Sweep Liquid would rise and form a liquid layer in the Inlet Chamber 42 floating on the added water, from which it can be readily recovered. If needed, high frequency vibrations including ultrasonic vibrations can also be applied to the depleted slurry to further aid the separation of Sweep Liquid from the surfaces of the solid particles. The liquid in the slurry left behind in the apparatus would be primarily water, which usually facilitates simple disposal of the slurry.

In the above descriptions there is an initial thickening phase followed by a Sweep phase, however a skilled person can see that the Sweep phase of the invention can also be applied to the original feed slurry without a specific separate thickening phase using any suitable configuration of the apparatus including those shown in FIG. 1 and FIG. 4. In some cases where the Sweep phase is used from the start the feed slurry has a low solids content and the present invention can be used to produce a thicker depleted slurry, i.e. having higher solids content, than the original feed slurry. Alternatively the original feed slurry may be particularly thick and it may be preferable to have a depleted slurry with a lower solids content than that of the feed slurry. There is no requirement in the process of the invention to produce a depleted slurry with higher or lower solids content than the feed slurry, however the invention provides the opportunity to do either.

High pressure differentials can be applied across the Filter Medium used in the apparatus of the present invention, including the examples presented in FIG. 1 (via connection 10) and FIG. 4 (via connection 48), provided the reservoir and Filter Medium and any other affected pressure retaining components are capable of operating at such high pressure differentials. Filtrate flow rate is approximately proportional to the pressure differential acting across the filter. Hence a pressure differential of 10 bar, which is within the pressure limits of the type of ceramic filter disc shown in FIG. 2, would typically result in more than three times the flow rate generated by a pressure differential of 3 bar. In conventional filtration in which a filter cake forms there is typically a maximum practicable pressure differential, often as low as 3 bar, beyond which the filter cake is compressed to such an extent as to significantly reduce its permeability, leading to little or no increase in filtrate flow despite the higher pressure differential. By comparison in the present invention there is an essentially incompressible slurry on the upstream side of the Filter Medium rather than a compressible filter cake, hence a rise in pressure differential has essentially no effect on permeability. In summary the potential efficiency of filtration, expressed as flow rate per unit of filter area, is significantly higher using the present invention because firstly there is no filter cake to impede the flow of filtrate and, secondly, much higher pressure differentials can be applied to further increase the flow rate.

In some applications a dispersing agent may also be added to the feed slurry as an additional means of holding the particles in suspension and avoiding the formation of a filter cake or other excessive accumulations of solid particles on the surface of the Filter Medium. In some cases it can then be possible to reduce the speed of motion of the Impeller or agitator if the lower speed in conjunction with the dispersing agent achieves a sufficient degree of particle suspension. The dispersing agent can also impede or prevent solids from settling and becoming more densely packed in Process Liquid in the Inlet Chamber. This can be helpful in application where it is preferable to keep the solids suspended to as high a level as possible in the Inlet Chamber so that the descending Sweep Liquid layer penetrates the slurry at a higher level. This can make it easier for the Sweep Liquid to displace Process Liquid out of the slurry. Acumer 1000 (a Dow product) is an example of a dispersing agent that has performed well for this purpose in preliminary experiments with slurries containing glycol based Process Liquid and particles of calcium carbonate.

Experiments conducted by the inventor show that in some applications a controlled degree of turbulence in the Inlet Chamber is helpful to keep the solids suspended to as high a level as possible in the Inlet Chamber so that the descending Sweep Liquid layer penetrates the slurry at a higher level. This can make it easier for the Sweep Liquid to displace Process Liquid out of the slurry. Use of particularly large quantities of Sweep Liquid can be desirable in some applications to, for example, more thoroughly eliminate a particularly harmful Process Liquid from the depleted slurry.

In some cases even with a Sweep Liquid that is miscible with the Process Liquid there may be little concern if the use of extra Sweep Liquid results in a significant amount of Sweep Liquid mixed with the Process Liquid that is recovered as filtrate. For example if the Process Liquid and Sweep Liquid are miscible potentially harmful organic liquids while the solid matter is a waste material, it can be important to strip essentially all harmful liquids out of the final waste slurry to enable low cost disposal. This can be done as described above using the process and apparatus of the invention with, if necessary, an excess of Sweep Liquid. The consequence may be an increased amount of Sweep Liquid that is mixed with the recovered Process Liquid, however this may be acceptable, or even desirable. For example a light hydrocarbon liquid used as Sweep Liquid could both recover and upgrade a heavy hydrocarbon Process Liquid that must be separated from waste solid matter. In this case the process of separating the heavy Process Liquid from the feed slurry using a light hydrocarbon Sweep Liquid results in a clean waste slurry and an upgraded Process Liquid.

In some applications the Sweep Liquid is primarily comprised of one or more of naphtha, natural gas liquids, pentane, hexane, heptane, white spirit, mineral turpentine, diesel, gasoline, other light hydrocarbon liquids, organic solvents, or a mixture thereof. These light hydrocarbon liquids can often offer an attractive combination of one or more of: low density, low viscosity, insoluble in water, ready availability, low cost, familiarity, non-reactive, non-corrosive (or offering protection against corrosion) and acceptable HSE risk. This type of Sweep Liquid can typically be readily separated and recovered from the depleted slurry using water.

It has been further observed that use of this type of light hydrocarbon liquid as a Sweep Liquid works well when treating slurries containing water soluble Process Liquids such as glycols and amines. The large density difference and lack of miscibility promote excellent separation of the Sweep Liquid from the Process Liquid during the Sweep phase of operation. Essentially all of the Process Liquid is thereby recovered with essentially no dilution. If some Sweep Liquid is swept through the Filter Medium with the filtrate it can typically readily be skimmed off later from the surface of the filtrate. The Sweep Liquid can then be separated and recovered from the depleted slurry using water.

In many applications it is further desirable for the Sweep Liquid to be less viscous than the Process Liquid. In many applications in which the Sweep Liquid is substantially non-miscible with the Process Liquid it can be further desirable to select a Sweep Liquid that does not form a persistent emulsion when mixed with the Process Liquid.

There are numerous means of applying sufficient differential pressure acting across the Filter Medium to push filtrate through the Filter Medium including any one or more of: connecting the liquid or vapour in the Inlet Chamber to a source of high pressure such as the discharge port of a compressor or pump; connecting the liquid or vapour in the Outlet Chamber to a source of low pressure or vacuum such as the inlet port of a pump or vacuum pump; filling the Inlet Chamber with feed slurry or Sweep Liquid to a depth of liquid above the Filter Medium so as to create a sufficient head of liquid acting on the upstream surface of the Filter Medium; applying the slurry flow restriction and rotating the Impeller, if there is an Impeller, at a high enough speed to create an effect similar to that of a centrifugal pump whereby the pressure in the liquid in the radially outer part of the Housing rises and pushes filtrate through the Filter Medium. Furthermore it has been observed that when the Impeller is submerged in slurry and operating at a sufficiently high speed, and the slurry flow restriction is particularly restrictive, the rise in pressure in the slurry pressure zone can readily exceed 1 bar, thereby causing filtrate to flow through the Filter Medium at a significant flow rate, which may on its own enable efficient use of this invention within an atmospheric (i.e. not a pressure vessel) reservoir and with no need for an external source of pressure differential.

In another embodiment the Sweep phase of operation can proceed with the slurry agitation means running slowly or turned off, in which case there is greater risk of a filter cake or other accumulation of solid particles forming on at least a portion of the upstream surface of the Filter Medium, which typically reduces the flow of filtrate, however there may also be less risk of excessive mixing of Sweep Liquid and Process Liquid. The operator of the process and apparatus of the invention is able to modify and optimise the degree of slurry agitation that achieves the desired results at any time during the operation of the apparatus.

In another embodiment the differential pressure that is applied across the Filter Medium is markedly higher than the typical maximum differential pressure that is used in conventional filtration processes in which a filter cake is formed. Reference books on filtration refer to 3 bar as a typical practical limit for the pressure differential because higher pressures compress the filter cake, causing a significant reduction in cake permeability and increased resistance to the flow of filtrate. By comparison the process and apparatus of the invention described herein can operate effectively using much higher pressure differentials including above 10 bar because there is no filter cake. The slurry agitation means can be used to prevent clogging of the Filter Medium and thereby maintain particularly high filtrate flow rates. Alternatively a Filter Medium having a particularly small pore size can be operated at high filtrate flow rates because of the higher pressure differential while the small pore prevents solid particles in the feed slurry from penetrate and clogging the Filter Medium. The smaller pore size also improves the separation of particles from Process Liquid by reducing the cut size of particles that can pass through the Filter Medium. Overall the use of the process and apparatus of the invention at high pressure differentials can increase filtration throughput by an order of magnitude when compared to conventional filter cake type of filtration that have limited ability to operate at high pressure differential. This improvement in performance results in smaller lower cost filtration systems.

In a further embodiment the separation of Sweep Liquid from the depleted slurry is done after transferring the depleted slurry to a second reservoir. In one variation of this embodiment the depleted slurry is placed into the second reservoir and then water is slowly added from below. The rising water lifts the Sweep Liquid up out of the depleted slurry. Alternatively water is placed into the second reservoir first and the depleted slurry is floated across the top of the water. The solid particles sink out of the slurry and into the water.

If the density of the Sweep Liquid is greater than that of fresh water but less than 1.15 g/ml, or if a particularly large density difference is desirable, then salty water instead of ordinary tap water can be used in the flotation methods described above. Salty water that is saturated in sodium chloride has a density of 1.2 g/ml.

Even if the Sweep Liquid is substantially miscible with water it is still readily possible to keep the Sweep Liquid sufficiently separated from the water, however it becomes important to avoid mixing the two liquids because they will not separate if previously mixed together at any stage of the process. As described in U.S. Pat. No. 8,728,321 it is readily possible to keep mutually miscible fluids separated while performing processes similar to the flotation methods described above.

Mechanical vibrations, including ultrasonic vibrations, can be applied, typically in short bursts, during the above flotation methods to help to strip Sweep Liquid off of the surfaces of the solid particles. The vibrations create high frequency localised low magnitude fluid oscillations across the particle surfaces that help to detach the Sweep Liquid from the particles but without large movements of the liquids or the particles. The particles tend to remain in the lower layer of water while the stripped Sweep Liquid quickly rises out of the water and into the upper layer of Sweep Liquid.

A further method of separating Sweep Liquid from depleted slurry is to vaporise some or all of the Sweep Liquid. If the Sweep Liquid is a volatile hydrocarbon liquid such as pentane or hexane then the vaporisation could occur by absorbing ambient heat. If it is desirable to vaporise the Sweep Liquid faster than a heating step could be added and/or the depleted slurry could be connected to a vacuum.

Experiment Example 1

The inventor has conducted experiments using the apparatus of FIG. 1 in which the Filter Medium comprised two circular aluminium oxide ceramic filter discs manufactured by Kerafol of Germany. FIG. 2 shows the photographic image of one of the filter discs used in the experimental apparatus. The discs were 374 mm dia with a 91 mm central hole. The effective pore size was 0.2 micron. After allowing for attached components for sealing, filtrate collection and holding the two filter discs in place the net available upstream surface area of the Filter Medium was 0.35 m$^2$.

The reservoir was made of clear acrylic and had an internal diameter of 418 mm and an overall height of 1200 mm. FIG. 3 shows a photographic image of one of the three identical Impeller rotors used in the experimental apparatus. The main components of the Housing and Impeller assembly were; a circular bottom plate, a ring spacer, the bottom rotor, a second ring spacer, the middle rotor, a third spacer, the top rotor, and a top plate including the Housing inlet opening. A central vertical shaft connected the top plate of the Housing assembly to a standard AC electric motor mounted on top of the apparatus. The drive assembly included electronic variable frequency control to enable the speed to be varied. Additional features were present to redirect recirculating slurry horizontally out of restrictive slurry outlets in the periphery of the Housing inwards towards the Housing inlet openings. A clear polycarbonate feed cone having a 63 deg slope was installed in the Inlet Chamber to direct feed slurry towards the centrally located inlet openings in the Housing, that were directly above the central suction zone of the rotating impeller rotors. A perforated plate and layer of ball bearings was placed in the bottom of the cone as depicted in FIG. 1. The filtrate flowed into a filtrate collection tank connected to a vacuum pump.

The feed slurry used in the experiment comprised 200 ltr of a solution of 60% monoethylene glycol and water, mixed with 9.1 kg of fine calcium carbonate particles supplied by Omya under the trade name of Omyacal 1OTK and having a mean particle size of 9 micron and a minimum particle size of 0.5 micron. The solids content of the feed slurry was 4.0 wt %. Feed slurry was introduced to fill the reservoir to about 0.9 m depth above the top of the Housing and the motor was operated to rotate the Housing and Impeller assembly clockwise at 350 rpm. At this rotational speed the theoretical average TMP across the Filter Medium generated by centrifugal pumping forces was calculated to be 0.14 bar. The vacuum pump was operated to reduce the pressure in the filtrate collection tank to −570 mm Hg, or 0.25 bar. The total average TMP was held within a range of 0.92 to 0.96 bar during the experiment and comprised the centrifugal pumping pressure created by the rotating Impeller rotors, plus the head of liquid above the Filter Medium, plus the vacuum in the filtrate collection tank.

The filtration with Housing/Impeller rotation continued until the slurry volume was reduced to 40 ltr, corresponding to a solid content of about 20 wt %. The rated clean water flux for the filter discs was 700 lph/m$^2$-bar and the actual measured filtrate flow was within 10% of this clean water flux throughout the thickening phase, indicating essentially no drop in flux as the solids content rose.

The Sweep phase began by spraying tinted water as Sweep Liquid into the top of the reservoir to create a layer of water floating on the Process Liquid layer of MEG-water solution just above the top of the feed cone. As the layer of water above the Process Liquid deepened the rate of water addition was increased because there was less risk of mixing with Process Liquid. The interface zone was observed to be narrow indicating very little mixing of Process Liquid with water. This was expected based on prior experience with maintaining separation between miscible liquids as described in U.S. Ser. No. 13/823,213. Housing/Impeller rotation continued at 350 rpm. Some turbulence in the form of a gentle circular clockwise current was observed in the top of the liquid but this had no readily observable effect on the mixing of the Process Liquid with the water.

Filtration and rotation continued and the Interface Zone and bottom of the water (Sweep Liquid) layer were observed to descend at a rate in proportion to the filtrate flow. The slurry compacted slightly and the layer of water caught up with the top of the slurry. There was no visible impediment to penetration of the slurry by the water, indicating that the water was beginning to displace the Process Liquid out of the slurry. The gentle turbulence within the feed cone had the effect of keeping solid particles suspended while the water layer descended through the slurry and continued displacing Process Liquid.

Filtration and rotation continued until the volume of slurry, now depleted slurry, was reduced to about 15 ltr at which point the experiment was stopped. Samples of the depleted slurry were taken and the solids content was measured to be 45 wt %. The filtrate flow rate throughout the Sweep phase remained within 80% of the rated clean water flux for the filter discs. The MEG content in the depleted slurry was also measured and determined to be 1.9 wt %, indicating a loss of MEG of 0.2 ltr, equating to an overall loss of Process Liquid of less than 0.2%.

Use of the invention is expected to be effective in treating the type of solids-contaminated oily liquids often encountered in the oil and gas industry such as the separation and recovery of oil or diesel from sediments in storage tanks or oil at refineries where the oil is contaminated by coking fines, corrosion products, fine sand or clay, scale inhibition by-products, solid matter scraped off of equipment or piping, and/or other unwanted solid particles. Solid waste particles in these oily liquids can be difficult to fully separate from the more valuable oily process liquids with which they are mixed. The oily process liquids are often viscous and can adhere to the surfaces of the waste solid particles. In these cases the list of potential choices of miscible Sweep Liquid can include: light oil; a natural gas liquid; pentane; hexane; heptane; naphtha; other light hydrocarbon liquid; gasoline; kerosene; diesel; bio-diesel; organic solvent; or a mixture thereof, possibly with the addition of surfactant or dispersant to improve the separation of the particles from the oily process liquid.

Use of a light, low density, low viscosity hydrocarbon Sweep Liquid (e.g. natural gas liquids) helps strip a significant portion of the oily process liquid from the surfaces of the particles and promotes the conversion of the slurry above the Filter Medium into a slurry that contains the lighter and less viscous Sweep Liquid rather than the heavier viscous original oily process liquid. A potential advantage of this method and choice of Sweep Liquid is that if the Sweep Liquid is miscible with and compatible with the oily process liquid and its properties such as low viscosity are deemed to be acceptable or even desirable, then the dilution of the oil based or oil-like process liquid by the Sweep Liquid may not be a concern.

Further examples of valuable or potentially harmful process liquids that can become contaminated with fine particulate matter and for which this invention warrants consideration using a variety of Sweep Liquids that may be miscible with water and/or the process liquid or non-miscible with water and/or the process liquid, include: coolants and cutting fluids used in metal cutting and metal forming; liquids used in solvent extraction mineral processing and metal refining; mother liquors in crystallisation processes; drilling, hydraulic fracturing and completion fluids used by the oil and gas industry; automotive and aircraft fluids (coolant, antifreeze/de-icing, brake fluid, transmission fluid, oil); amines used at refineries to remove acid gases; heat transfer fluids; hydraulic fluids; lubricating oils; liquids used as part of the manufacturing process of cosmetics, pharmaceuticals, plastics, other petrochemicals, and electronics; black liquor at pulp and paper mills; toxic industrial liquid effluent.

While the invention has been described here with reference to certain preferred embodiments, a person of ordinary skill in the art will recognise that many of the components and parameters may be varied or modified without departing from the scope of the invention. Furthermore, where known equivalents exist to specific features, such equivalents are incorporated as if specifically referred to in this specification.

What is claimed is:

1. A filtration process for recovering Process Liquid that is at least partially miscible with water from a feed slurry that predominantly comprises a mixture of the Process Liquid and solid particles, the process including the steps of:
   (a) introducing the feed slurry into a reservoir above a substantially horizontal Filter Medium therein and wherein the Filter Medium allows liquids to flow through it while blocking the passage of more than 50 wt % of the solid particles in the feed slurry through the Filter Medium, and;
   (b) introducing into the reservoir above the Filter Medium a Sweep Liquid that is less dense than and not miscible with water, and less dense than and non-miscible with the Process Liquid to create a lower layer of liquid that is in contact with the upstream surface of the Filter Medium and predominantly comprises Process Liquid and an upper layer of liquid that predominantly comprises Sweep Liquid and an interface between the two liquid layers, and;
   (c) applying a pressure differential across the Filter Medium, wherein said pressure differential causes liquid to flow through the Filter Medium as filtrate, and;
   (d) preventing an excessive accumulation of solid particles on the upstream surface of the Filter Medium by agitating at least a portion of the slurry that is in close proximity to the Filter Medium and;
   (e) allowing the flow of liquid through the Filter Medium in step (c) and the prevention of excessive accumulation of solid particles onto the surface of the Filter Medium in step (d) to continue until at least a portion of the Process Liquid has been displaced out of the slurry through the Filter Medium thereby forming a depleted slurry above the Filter Medium that comprises solid particles and Sweep Liquid and is depleted of Process Liquid, and;
   (f) recovering at least a portion of the filtrate from the reservoir.

2. The process as claimed in claim 1 wherein the Sweep Liquid includes a liquid selected from the group consisting of: naphtha; natural gas liquids; pentane; hexane; heptane; white spirit; mineral turpentine; diesel; gasoline; light hydrocarbon liquids; organic solvents; and a mixture thereof.

3. The process as claimed in claim 1 wherein the process further includes after step (e) the additional step of applying a depleted slurry treatment method that separates at least a portion of the Sweep Liquid from the depleted slurry.

4. The process as claimed in claim 3 wherein the depleted slurry treatment method includes at least one step selected from the group consisting of: filtering the depleted slurry so as to reduce its liquid content, and; vaporising at least a portion of the Sweep Liquid in the depleted slurry, and; introducing water into the reservoir underneath the depleted slurry in sufficient quantity so that the level of introduced water rises through at least a portion of the depleted slurry so as to separate by flotation at least a portion of the Sweep Liquid from the depleted slurry, and; removing at least a portion of the depleted slurry from the reservoir and placing water and said removed depleted slurry into a second reservoir to create an aqueous lower layer of liquid that predominantly comprises water wherein at least a portion of the solid particles that had been contained in the removed depleted slurry are allowed to accumulate by gravity settling and to create an upper layer of liquid that predominantly comprises Sweep Liquid that floats on the aqueous lower layer.

5. The process as claimed in claim 1 wherein the process further includes the step of adding a dispersing agent to the feed slurry.

6. The process as claimed in claim 1 wherein the slurry is agitated in step (d) by moving the Filter Medium back and forth horizontally, or by rotating the Filter Medium about a vertical axis of rotation, or by moving an agitator in a plane that is parallel to and in close proximity to the upstream surface of the Filter Medium.

* * * * *